(12) United States Patent
Tran

(10) Patent No.: US 7,373,326 B1
(45) Date of Patent: May 13, 2008

(54) SYSTEM AND METHOD FOR DEVELOPING AND USING A REQUEST FOR TRANSACTION FRAMEWORK

(75) Inventor: Tuan Tran, Santa Clara, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 1284 days.

(21) Appl. No.: 09/711,945

(22) Filed: Nov. 15, 2000

(51) Int. Cl.
*G06Q 40/00* (2006.01)

(52) U.S. Cl. .................. 705/37; 705/35; 705/36 R; 705/41

(58) Field of Classification Search .......... 705/35, 705/36, 37, 38, 36 R, 41
See application file for complete search history.

(56) References Cited

U.S. PATENT DOCUMENTS

| | | | | |
|---|---|---|---|---|
| 6,131,087 | A * | 10/2000 | Luke et al. ............. | 705/26 |
| 6,278,982 | B1 * | 8/2001 | Korhammer et al. ..... | 705/37 |
| 6,789,252 | B1 * | 9/2004 | Burke et al. ........... | 717/100 |
| 2002/0128955 | A1 * | 9/2002 | Brady et al. ............ | 705/37 |

OTHER PUBLICATIONS

Bid.Com Launches Next Generation Procurement Solution, Nov. 8, 2000, Canada NewsWire. Ottawa. p. 1.*

Gwangheon, H. et al., An Empirical Study of Bond Market Transactions, Mar./Apr. 2000. Financial Analysts Journal. vol. 56, Iss. 2; p. 32, 15 pgs.*

* cited by examiner

*Primary Examiner*—Hani M. Kazimi
*Assistant Examiner*—Stefano Karmis
(74) *Attorney, Agent, or Firm*—William J. Kubida; Michael C. Martensen; Hogan & Hartson LLP

(57) ABSTRACT

A system for developing and using a request for transaction framework including a framework engine configured to enable a market maker to develop a request for transaction for a particular market, and a request for transaction engine configured to enable an organization within the relevant market to prepare a request for transaction relating to a resource requirement and select a response relating to the resource requirement. In a preferred embodiment, the market maker creates a request for transaction framework by manipulating attribute parameters and identifying an analysis framework. A request for transaction framework may be a request for proposal framework, a request for quote framework, or other type of framework in which there is a request followed by a plurality of responses and a selection of one of the responses.

11 Claims, 4 Drawing Sheets

SYSTEM AND METHOD FOR DEVELOPING AND USING A REQUEST FOR TRANSACTION FRAMEWORK

CROSS REFERENCE TO RELATED APPLICATIONS

The present application relates to U.S. Non-provisional application Ser. No. 09/712,136, for SYSTEM AND METHOD FOR USING A REQUEST FOR TRANSACTION IN CONJUNCTION WITH A REVERSE AUCTION, filed Nov. 15, 2000, which is hereby incorporated by reference.

BACKGROUND OF THE INVENTION

1. Field of the Invention

The present invention relates to a system and method for developing and using a request for transaction framework. More specifically, the present invention relates to a system and method for developing a request for transaction framework using a framework engine and employing this request for transaction framework to conduct requests for a transaction in a particular market.

2. Description of Related Art

A number of systems offer requests for transaction (RFT) services. For example, many web sites offer request for proposal (RFP) and request for quote (RFQ) services for a particular resource requirement, such as a good or service. Many of these systems are designed to request a quote from a particular product provider or service provider, referred to collectively as providers. Accordingly, an organization may be required to prepare a number of requests for a number of different providers. Similarly, many systems do not allow an organization to analyze a number of competing responses in a robust manner. Instead, many systems allow limited analysis based on, for example, a single resource attribute such as price. Furthermore, the process of modifying current systems to enhance the efficiency of an existing market or to accommodate a new market may be infeasible or prohibitively complex and expensive.

SUMMARY OF THE INVENTION

Accordingly, the present invention is directed to a system for developing and using an RFT framework system and method that substantially obviates one or more of the problems due to limitations and disadvantages of the related art.

An object of the present invention is to provide a system and method for developing and using an RFT framework. For example, a market maker may develop a new RFT framework or modify an existing RFT framework which, in turn, may be used by market participants to conduct RFTs. An RFT framework may be a software, hardware, and/or network platform by which a number of organizations participate in an RFP or RFQ process.

In one embodiment, the invention comprises a framework engine that enables a market maker to develop a request for transaction for a particular market, and a request for transaction engine to enable an organization within the relevant market to prepare a request for transaction relating to a resource requirement and select a response relating to the resource requirement. In a preferred embodiment, the market maker creates a request for transaction framework by manipulating attribute parameters and identifying an analysis framework.

In another embodiment, the present invention comprises the method of developing a request for transaction framework that establishes a set of relevant attributes for a particular market, receiving a request for transaction, wherein an organization in the particular market indicates a resource requirement by indicating a set of values for the set of relevant attributes, receiving a plurality of responses to the request, wherein a plurality of providers for the particular market develop the plurality of responses by indicating a set of values for the set of relevant attributes, and determining a selected response by the organization based on the set of values for the set of relevant variables provided in the plurality of responses.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
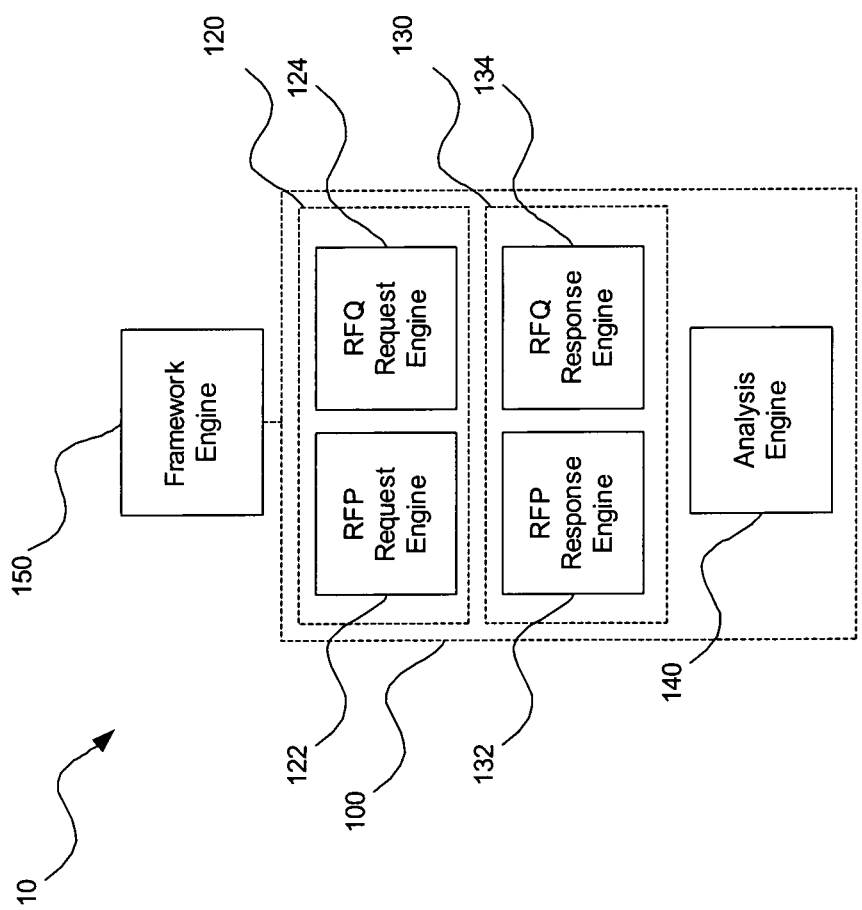
FIG. 1 shows a block diagram of an embodiment of the present invention.

Reference will now be made in detail to the preferred embodiment of the present invention, examples of which are illustrated in the drawings.

FIG. 1 shows a block diagram of an embodiment of the present invention. By way of overview, system 10 comprises request for transaction engine 100 and framework engine 150. Request for transaction engine 100 comprises preparation engine 120, proposal engine 130, and analysis engine 140. Request engine 120 manages all processes relating to RFT request preparation. Response engine 130 manages all processes relating to RFT response preparation, wherein a response is associated with a particular request. Analysis engine 140 manages all processes relating to request and response analysis, such as sorting, filtering, and comparing requests and responses. Each of these components is described in greater detail below.

Request for transaction engine 100 manages all processes relating to RFTs. Request for transaction engine 100 may comprise software, hardware, and/or network resources. In a preferred embodiment, request for transaction engine 100 comprises one or more web servers and one or more data stores accessible to a plurality of client devices via a network, such as the Internet. RFTs may include RFPs, RFQs, and other types of transactions in which there is a request from an organization, a response from a plurality of providers, and a selection of one of those responses from the organization. For purposes of this application, a distinction between an RFP and an RFQ is that an RFP may be more complicated than an RFQ. For example, an RFQ may comprise a resource requirement that is expressed using one or more line items. An RFP, on the other hand, may comprise a more complicated request in which some or all of a resource requirement is expressed without a line item, such as by using unstructured text.

In one embodiment, request for transaction engine 100 enables an organization within the relevant market to prepare an RFT relating to a resource requirement. Additionally, request for transaction engine 100 may enable the organization to select a response relating to the resource requirement. Request for transaction engine 100 may comprise request engine 120 and response engine 130. In a preferred embodiment, each of these engines 100, 120, 130 comprise source code for a graphical user interface (GUI) as described in greater detail below.

Request engine 120 manages all processes relating to RFT request preparation. Specifically, request engine 120 enables an organization to prepare and transmit a request. Preferably, the request is comprised of structured attribute information. Structured attribute information is information relating to the resource requirement having a predetermined data type (e.g., integer, double, character, string), data meaning (e.g., price, weight, color, quality rating), and data value (e.g., $100.00 US, 30 kilos, brown, A). Structured attribute information may additionally have data constraints (e.g., maximum value, minimum value, required range, forbidden range) and data presentation characteristics (e.g., percentage representation, date representation). The attribute values and information about the attribute values may be stores as tagged elements in an eXtensible Markup Language (XML)-compliant document. Unstructured information may lack either a data type requirement, a data meaning requirement, or both.

Request engine 120 may include RFP request engine 122 and RFQ request engine 124. RFP request engine 122 may enable an organization to prepare and transmit a request for proposal, whereas RFQ request engine 124 may enable an organization to prepare a request for quote. RFP request engine 122 may be used to prepare a proposal in which some or all of the request for proposal is unstructured information. RFQ request engine 124, on the other hand, may be used to prepare a request for quote in which all of the quote is structured attribute information.

In one embodiment, RFQ request engine 124 may comprise source code relating to a RFQ request GUI. The RFQ request GUI may include a number of input controls for a number of attributes. By manipulating the controls, an organization user (i.e., a user associated with an organization) may create structured attribute information associated with the response. For example, by providing a value "123" to a control labeled "Product Identification Number," the RFQ request engine 124 may create or modify an XML document such that the value is marked-up as parsed character data between two ProductID tags. In one embodiment, a request for quote consists entirely of structured attribute information.

Similarly, by using RFP request engine 122, an organization user may create or modify a request comprising structured attribute information and unstructured information. For example, RFP request engine 122 may comprise source code relating to a RFP request GUI. The RFP request GUI may include a number of input controls for a number of attribute values as well as one or more unstructured information input controls. The unstructured information input controls may be input boxes that enable an organization to provide a textual description of an aspect of the resource requirement. Similarly, the unstructured information input controls may be an attachment control for attaching a file to provide textual, visual, and/or audible description of an aspect of the resource requirement. Other types of controls for providing unstructured information may also be used.

Response engine 130 manages all processes relating to RFT response preparation, wherein a response is associated with a particular request. Response engine 130 may include RFP response engine 132 and RFQ response engine 134. RFP response engine 132 may enable an organization to prepare and transmit a response to a request for proposal, whereas RFQ response engine 134 may enable an organization to prepare a response to a request for quote. RFP response engine 132 may be used to prepare a proposal in which some or all of the response is unstructured information. RFQ response engine 134, on the other hand, may be used to prepare a quote in which all of the quote is structured attribute information.

In one embodiment, RFQ response engine 134 may comprise source code relating to a RFQ response GUI. The RFQ response GUI may include a number of input controls for a number of attributes. By manipulating the controls, a provider user (i.e., a user associated with a provider) may create structured attribute information associated with a quote. In one embodiment, a quote consists entirely of structured attribute information. Similarly, using RFP response engine 132, a provider user may create a response comprising structured attribute information and unstructured information. The RFP response GUI may include a number of input controls for a number of attribute values as well as one or more unstructured information input controls.

Analysis engine 140 manages all processes relating to request and response analysis, such as sorting, filtering, and comparing requests and responses. The types of analysis available to an organization using analysis engine 140 may be determined by an analysis framework, which in turn may be established by a framework engine 150 as described in greater detail below. In one embodiment, analysis engine 140 comprises source code relating to a RFQ, RFP, quote and proposal analysis GUIs. For example, a provider user may use a quote analysis GUI to sort all pending RFQs by price, to filter out RFQs from particular countries, or otherwise analyze a plurality of pending RFQs. Similarly, a proposal analysis GUI may be used by an organization user to filter out all proposals that do not satisfy a completion date requirement, and sort based first on price and second based on years of experience of the provider. In one embodiment, complex comparisons may be implemented using analysis engine 140. For example, an organization may want to be able to sort based on price if price difference is significant, and sort based on provider experience if price difference is not significant. The organization may define the range of significant price difference. Proposals having a price difference within the range of significance may then be sorted based on experience of the provider, for example. Other attributes may be used in complex comparisons.

Analysis engine 140 may be used to sort RFQs, RFPs, quotes and proposals independent of the language, currency, and unit or measure in which the RFQs, RFPs, quotes and proposals were created. For example, if a first organization creates a first RFQ and a second organization creates a second RFQ, with both organizations using RFQ request engine 124, a provider user may analyze both RFQs in the first language, the second language, or a third language based on a language associated with the provider user. In a preferred embodiment, the language, currency, and unit of measure employed by request engine 120 and the other components of request for transaction engine 100 is determined by a language, currency, and unit of measure associated with an authenticated user. Similarly, the present invention may change the value of a time-based attribute based on a time-zone associated with a user. For example, if an organization creates a request having a deadline for submitting proposals based on a first time zone, the system may adjust the deadline so that it is based upon a second time zone associated with a provider user when the provider user reviews the request.

Framework engine 150 manages all processes relating to the creation of an RFT framework. In one embodiment, an RFT framework comprises the rules and processes with which organizations and providers may participate in RFTs in a relevant market. An RFT framework may determine which attributes are present in a particular GUI (e.g., RFQ request GUI, RFP response GUI, an analysis GUI) and attribute parameters (e.g., name, default values, ranges, required or optional). In a preferred embodiment, framework engine 150 also enables the creation of new attributes if there are relevant attributes for which there are no existing attributes. For example, if a new type of product is developed, a new type of attribute may be created using framework engine 150 in order to provide an attribute that adequately describes the new type of product, as described in greater detail below in relation to FIGS. 3 and 4.

Figure 2:
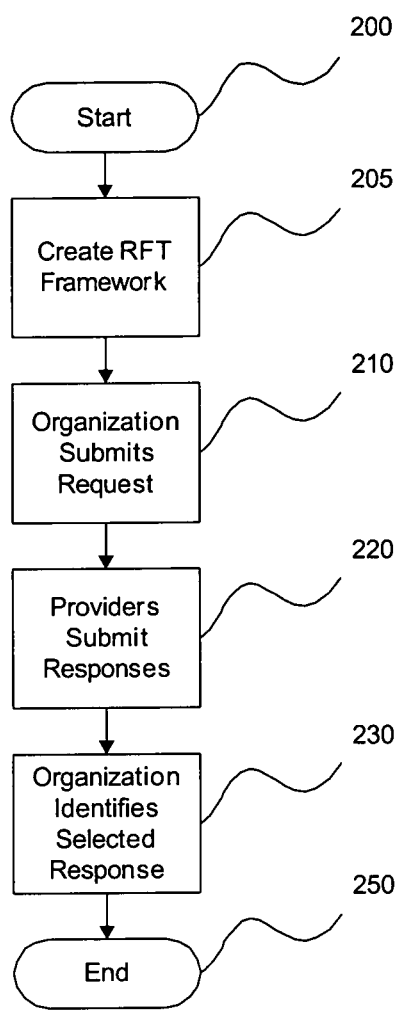
FIG. 2 shows a flow chart of using an RFT framework created in accordance with the present invention.

FIG. 2 shows a flow chart of developing and using an RFT framework in accordance with the present invention. By way of overview, the RFT framework development and use process begins at step 200. At step 205, an RFT framework is created. At step 210, an organization submits a request. At step 220, a plurality of providers submit responses to the request. At step 230, the organization analyzes a selected response. The process terminates at step 240. Each of these steps is described in greater detail below.

Figure 3:
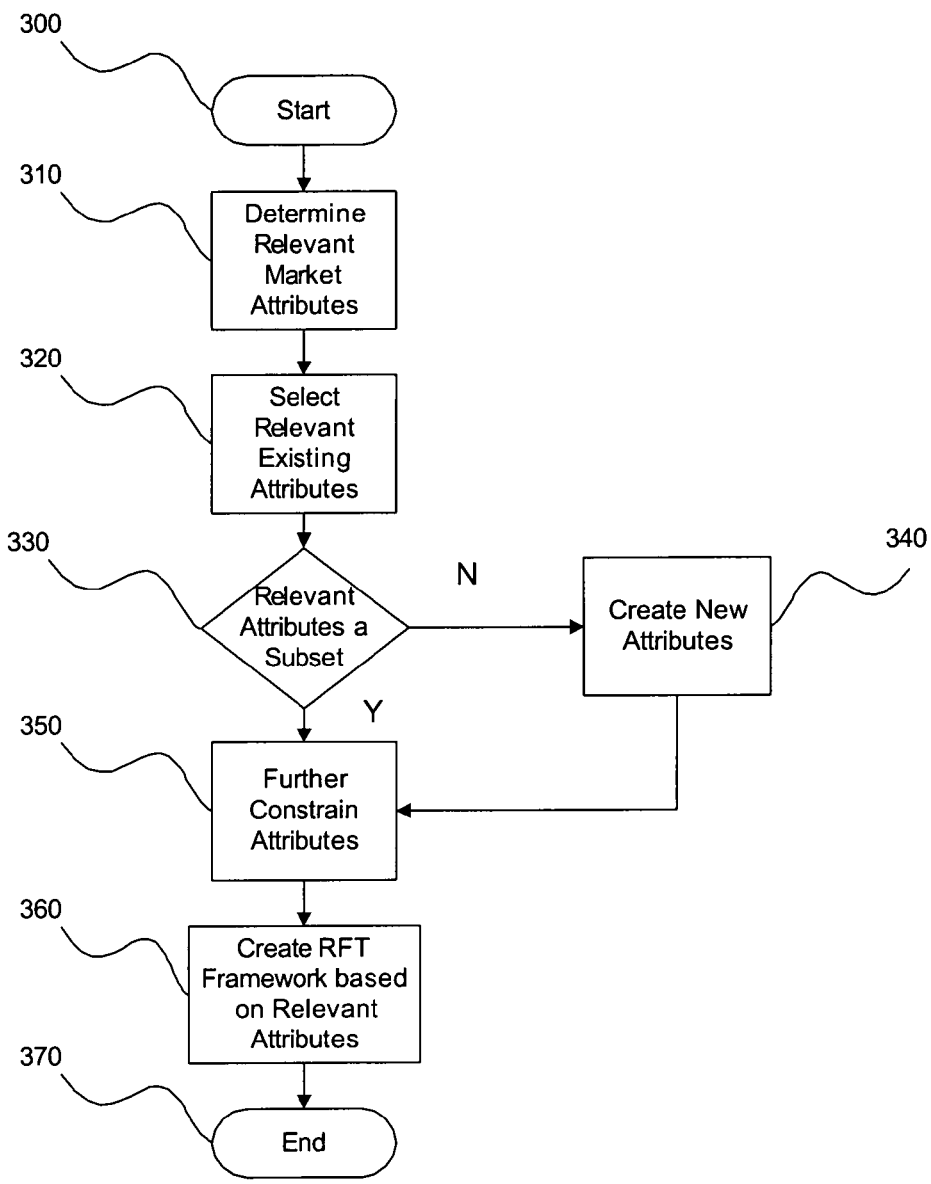
FIG. 3 shows a flow chart of an RFT framework creation process in accordance with the present invention.

At step 205, an RFT framework is created. FIG. 3 provides an exemplary process of developing an RFT framework. By way of overview, RFT framework creation process comprises determining relevant market attributes, selecting existing relevant market attributes, selectively creating new attributes, further constraining each of the relevant attributes, and developing an RFT framework based on the relevant attributes and their associated attribute parameters. Each of these steps is explained in greater detail below with respect to FIG. 3.

At step 210, an organization submits a request. Pursuant to this step, an organization may select a type of request to create from a plurality of possible RFT frameworks. For example, an organization may access a particular RFT framework by visiting a first website, or may select a particular RFT out of a plurality of RFT frameworks from a second website that offers several RFT frameworks. After selecting an appropriate RFT framework, the organization may be provided a GUI having various input controls and input control labels relevant to the organizations relevant market. Additionally, the organization may be provided with a request wizard that prompts the organization for answers and, based upon the answers, prompts the organization for follow-up answers.

Upon providing the input, the organization may then submit the request. For example, the organization may activate a "Submit" control on a web page. The request may be transmitted to a web server, for example, which makes the request immediately available to a plurality of providers. In a preferred embodiment, the request may comprise structured attribute information and unstructured information. The structured attribute information preferably comprises attribute information that is relevant to the relevant market as determined during step 205.

At step 220, a plurality of providers submit responses to the request. Pursuant to this step, a plurality of providers may review the request provided by the organization in step 210 as well as other requests provided by other organizations. In one embodiment, a provider may review all requests that are compliant with a selected RFT framework. In another embodiment, a provider may provide a value for one or more attributes and review all matching responses. Upon identifying one or more satisfactory requests, a provider may submit a response. Preferably, a plurality of providers respond to a particular request. In one embodiment, the responses may comprise structured attribute information and/or unstructured information. In one embodiment, as each of the plurality of providers respond to the request, the organization that is responsible for the request may review the response and previously submitted responses. In another embodiment, the responses may additionally be viewed by other providers. Responses may be provided until the organization closes the request, until a predetermined time, or until some other event or criteria is satisfied.

At step 230, the organization identifies a selected response. Pursuant to this step, the organization may review all of the responses submitted by various providers relating to the organization's request. The organization may analyze the offers by sorting with respect to various attributes, filtering based on various attributes, a combination thereof, or using other techniques as defined by the relevant RFT framework. Upon selecting a response, the selected response may then be used by the organization to enter an agreement with the provider that submitted the selected response. In one embodiment, the terms of the request and response may be used by the system to form a bill of sale, a contract, or other legal document that reflects the terms of the request and the response.

As indicated above, FIG. 3 shows a flow chart of a RFT framework creation process in accordance with the present invention. By way of overview, the RFT framework creation process is initiated at step 300. At step 310, the system determines relevant market attributes. At step 320, the system selects existing relevant market attributes. Via step 340, the system selectively creates new attributes. At step 350, the system may further constrain each of the relevant attributes. At step 360, the system creates an RFT framework based on the relevant attributes and their associated attribute parameters. In one embodiment, a market maker may invoke an RFT framework development function and the system may provide the market maker GUI by which the market maker may selectively create new attributes, manipulate attribute parameters, and identify an analysis framework. Each of these steps is explained in greater detail below.

At step 310, the system determines relevant market attributes. In a preferred embodiment, the system determines the relevant market attributes based on input received from a market maker, such as an organization that charges transaction fees for transactions completed while using the organization's resources. The system may facilitate the process of determining the relevant attributes by prompting the market maker with various questions, or the system may receive a set of relevant market attributes from the market maker. At the completion of this step, the system has a list of relevant attributes that may be used to conduct requests for transactions within a particular market.

At step 320, the system selects existing relevant market attributes. In this step, the system correlates relevant market attributes to existing market attributes. For example, the system may include a plurality of existing market attributes having predetermined data types (e.g., integer, double, character, string), data meanings (e.g., price, weight, color, quality rating), data values (e.g., $100.00 US, 30 kilos, brown, A), data constraints (e.g., maximum value, minimum value, required range, forbidden range) and/or data presentation characteristics (e.g., percentage representation, date representation). Additionally, the system may provide the market maker with a subset of the existing attributes based on input received from the market maker, such as a related industry or related RFT framework.

At step 330, the system selectively proceeds to step 350 if all the relevant attributes are satisfied by existing attributes and proceeds to step 340 of new attributes if all the relevant attributes are not satisfied by existing attributes. At step 340, the system creates new attributes. This step is explained in greater detail with respect to FIG. 4. By way of overview, the new attribute creation process is initiated at step 400. At step 410, an attribute name is selected. At step 420, an attribute data type is selected. At step 430, a data entry control type is selected. At step 440, attribute value constraints are provided. At step 450, attribute analysis options are created. At step 460, new attributes are created. At step 470, the process is terminated. Each of these steps is explained in greater detail with respect to FIG. 4.

At step 350, the system may further constrain each of the relevant attributes. For example, the market maker may further limit a data constraint. For example, if the attribute is a quality-rating attribute that has a drop down list as an input control, the market maker may provide the possible attribute values during step 350. Additionally, the market maker may refine range constraints, establish default values, establish independencies with other controls, or otherwise further constrain each of the relevant attributes.

At step 360, the system creates an RFT framework based on the relevant attributes and their associated attribute parameters. In this step, the system may process the input provided by the market maker and establish an RFT framework that complies with each of the market maker's limitations. In one embodiment, the RFT framework may be immediately available to all visitors to a web site managed by the market maker and/or on a web site managed by a third-party. In another embodiment, the market maker may provide access only to qualified market participants. Other access schemes may also be used.

Figure 4:
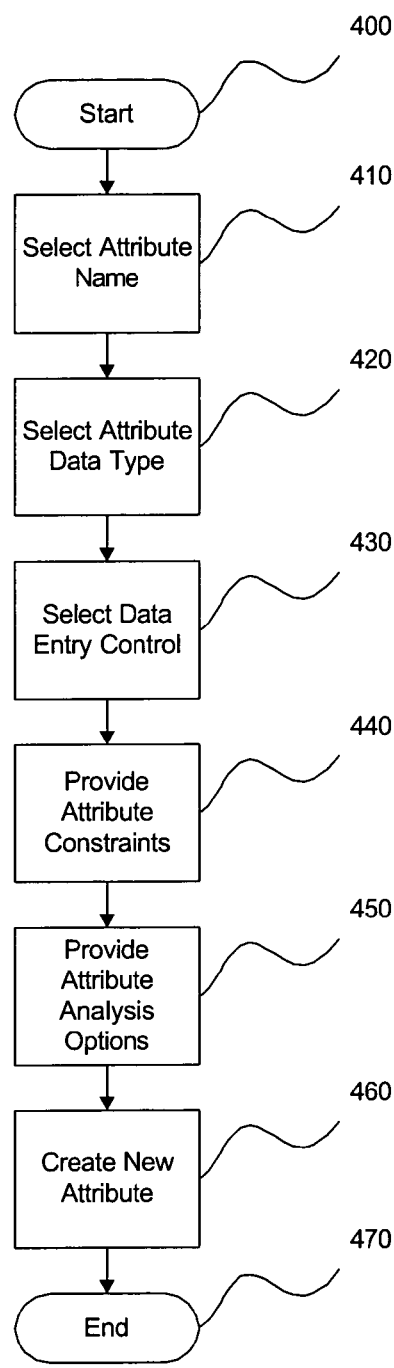
FIG. 4 shows a flow chart of an RFT framework creation process in accordance with the present invention.

FIG. 4 shows a flow chart of an RFT framework creation process in accordance with the present invention. By way of overview, the new attribute creation process is initiated at step 400. At step 410, an attribute name is selected. At step 420, an attribute data type is selected. At step 430, a data entry control type is selected. At step 440, attribute value constraints are provided. At step 450, attribute analysis options are created. At step 460, new attributes are created. At step 470, the process is terminated.

At step 410, an attribute name is selected. For example, the attribute name may be named "Carats" for a diamond RFT framework, "Player Name" for a baseball card RFT framework, or other names for other types of RFT frameworks. In one embodiment, the system may determine a plurality of correlating names in different languages based on a translation of the attribute name provided. Each of these names may be displayed to the market maker such that the market maker may modify one or more of the suggested translations. Upon completion of this step, the attribute name is stored, and in one embodiment a plurality of corresponding attribute names in foreign languages are stored as well.

At step 420, an attribute data type is selected. The attribute data type may be a predetermined data type, such as an integer, double, character, or string data type. Additionally, the data type may be a complex data type defined by a user, such as a class.

At step 430, a data entry control type is selected. For example, a market maker may select one of a drop down list, a list box, an input box, a combination box, a radio button, and a check box. Attribute constraints may be provided in step 440. For example, attributes may be provided with default values, value ranges, value options, or other constraints. Additionally, the attribute may be identified as mandatory or optional, meaning that a mandatory attribute must be provided by an end user, such as an organization or provider, prior to completing a process. Furthermore, the presentation format may be provided, such as percentage, date, time, or other presentation format.

At step 450, attribute analysis options are provided. For example, the market maker may identify that an attribute may be sorted and filtered, and identify a default presentation format based on the attribute. By way of specific example, a first market maker may create an attribute relating to "acceptable delay" whereas a second market maker may create an attribute relating to "hours of experience." The first market maker may provide a default sort ascending because a low delay is likely to be a desirable attribute value, whereas the second market maker may provide a default sort descending because a high degree of experience is likely to be a desirable attribute value.

The market maker may additionally determine how an end user may manipulate responses and/or requests based on a particular attribute value, such as simple sorting and filtering based on the variable. Additionally, the market maker may enable a complex sorting scheme, such as a sorting scheme in which responses and/or requests are sorted based on price if price difference is significant, and sorted based on provider experience if price difference is not significant. Proposals having a price difference within the range of significance may then be sorted based on experience of the provider, for example. The market maker may allow the organization to determine the range of significant price difference, may provide the range for the organization, or provide a default value that the organization may modify. These complex comparisons may be created by providing a GUI, in which case the complex comparison is generated, or by accepting code prepared by the market maker.

At step 460, new attributes are created. In one embodiment in which the new attributes are created using a GUI, the attributes may be generated by framework engine 150. In an embodiment in which a market maker does not use a GUI, this step may comprise making the new attribute available to framework engine 150, such as by saving the attribute information to a particular logical and/or physical location. At the completion of step 460, the new attribute is available to the market maker for use in developing an RFT framework. In one embodiment, the new attribute may be available to one or more other market makers to use in different RFT frameworks. The new attribute creation function terminates at step 470.

Although the present invention comprises an embodiment with a plurality of GUIs, the same functionality may be implemented without the use of GUIs. For example, to develop an RFT framework, the present invention may be implemented by defining an application programming interface (API) and providing this API to a market maker interested in developing an RFT framework.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A system for developing and using a request for transaction framework comprising:
    a framework engine configured to enable a market maker to develop a request for transaction framework for a particular market, wherein the framework engine creates the request for transaction framework for the particular market based on attribute parameters selected and defined by the market maker; and
    a request for transaction engine to manage a request for transaction using the request for transaction framework, and configured to enable an organization within the particular market to prepare a request relating to a resource requirement and select a response relating to the resource requirement, including selecting a response relating to the resource requirement by sorting a set of received responses based on price when two or more prices in the received responses differ by more than a preset amount and when the prices in the received responses do not differ by more than the preset amount, sorting the set of received responses based on another predetermined attribute in the response, wherein the preset amount is set based on input to the request for transaction means from a user of the system, wherein the request for transaction engine comprises a request engine, a response engine, and an analysis engine;
    wherein the analysis engine enables an organization to perform an analysis framework on a plurality of responses based on an extensible number of attributes, the analysis framework available to the organization being determined by the market maker using the framework engine and the extensible number of attributes comprising a set of attributes from an existing set of attributes and at least one new attribute defined by a user of the system and not present in the existing set of attributes, wherein the at least one new attribute is defined by setting an attribute value constraint defining at least one of selectable default values for the at least one new attribute, value ranges for the at least one new attribute, and a mandatory or optional setting for the at least one new attribute;
    wherein the request comprises structured attribute information relating to the resource requirement, the structured attribute information being defined by the market maker using the framework engine.

2. The system of claim 1, wherein the request engine comprises a request for proposal engine and a request for quote engine.

3. The system of claim 1, wherein the analysis engine enables a plurality of providers to perform an analysis framework on a plurality of requests based on an extensible number of attributes, wherein the analysis framework available to the plurality of providers is determined by the market maker using the framework engine.

4. The system of claim 1, wherein the response engine enables the plurality of providers to prepare and transmit a plurality of responses to the request.

5. The system of claim 1, wherein;
    the organization transmits information to and receives information from the request engine and the analysis engine based on a first language associated with an organization user; and
    each of the providers transmit information to and receive information from the response engine and the analysis engine based on a second language associated with a provider user.

6. The system of claim 1, wherein;
    the organization transmits information to and receives information from the request engine and the analysis engine based on a first currency associated with an organization user; and
    each of the providers transmit information to and receive information from the response engine and the analysis engine based on a first currency associated with a provider user.

7. The system of claim 1, wherein;
    the organization transmits information to and receives information from the request engine and the analysis engine based on a first unit of measure associated with an organization user; and
    each of the providers transmit information to and receive information from the response engine and the analysis engine based on a second unit of measure associated with a provider user.

8. A computer implemented method for developing and using a request for transaction framework comprising:
    developing an electronic request for transaction framework that establishes a set of relevant attributes for a particular market, the set of relevant attributes being selected from a set of existing market attributes based on input from a market maker and the set of relevant attributes including at least one user-defined attribute not present in the set of existing market attributes, wherein the at least one user-defined attribute is assigned an attribute analysis framework option defining allowable sorting or filtering for the at least one user-defined attribute;
    receiving a request for transaction, wherein an organization in the particular market indicates a resource requirement by indicating a set of values for the set of relevant attributes;
    receiving a plurality of responses to the request, wherein a plurality of providers for the particular market develop the plurality of responses by indicating a set of values for the set of relevant attributes;
    determining a selected response by the organization based on the set of values for the set of relevant variables provided in the plurality of responses wherein the determining of the selected response further comprises sorting the plurality of responses based on price when two or more prices in the plurality of responses differ by more than a preset amount and when the prices in the plurality of responses do not differ by more than the preset amount, sorting the plurality of responses based on a predetermined attribute in each of the plurality of responses, wherein the preset amount is set based on user input; and
    analyzing the plurality of responses based on an extensible number of attributes, the analysis framework available to the organization being determined by the market maker using the framework engine and the extensible number of attributes comprising a set of attributes from an existing set of attributes and at least one new attribute defined by a user of the system and not present in the existing set of attributes, wherein the at least one new attribute is defined by setting an attribute value constraint defining at least one of selectable default values for the at least one new attribute, value ranges for the at least one new attribute, and a mandatory or optional setting for the at least one new attribute.

9. The method of claim 8, wherein the request comprises structured attribute information relating to a resource requirement.

10. The method of claim 8, further comprising:
analyzing, by the plurality of providers, a plurality of pending requests based on an extensible number of user-selected attributes.

11. A system for developing and using a request for transaction framework comprising:
framework engine means for enabling a market maker to develop a request for transaction framework for a particular market, wherein the framework engine creates the request for transaction framework for the particular market based on attribute parameters selected and defined by the market maker; and
request for transaction means for managing a request for transaction using the request for transaction framework, and enabling an organization within the particular market to prepare a request for transaction relating to a resource requirement and select a response relating to the resource requirement including sorting a set of received responses based on price when two or more prices in the received responses differ by more than a preset amount and when the prices in the received responses do not differ by more than the preset amount, sorting the set of received responses based on another predetermined attribute in the response, wherein the preset amount is set based on input to the request for transactions means from a user of the system; and analysis engine means for enabling an organization to perform an analysis framework on a plurality of responses based on an extensible number of attributes, the analysis framework available to the organization being determined by the market maker using the framework engine and the extensible number of attributes comprising a set of attributes from an existing set of attributes and at least one new attribute defined by a user of the system and not present in the existing set of attributes, wherein the at least one new attribute is defined by setting an attribute value constraint defining at least one of selectable default values for the at least one new attribute, value ranges for the at least one new attribute, and a mandatory or optional setting for the at least one new attribute;

wherein the request comprises structured attribute information relating to the resource requirement, the structured attribute information being defined by the market maker using the framework engine.

* * * * *